2,893,948
Patented July 7, 1959

2,893,948

HIGH TEMPERATURE ACTIVATION OF A PAL-LADIUM-ALUMINA REFORMING CATALYST

William P. Hettinger, Jr., Dolton, Ill., assignor, by mesne assignments, to Engelhard Industries, Inc., a corporation of New Jersey No Drawing. Application January 10, 1955
Serial No. 481,024

9 Claims. (Cl. 208—138)

This invention relates to palladium reforming catalysts. More particularly this invention is concerned with a pretreatment or activation method for palladium-containing reforming catalysts and a method of employing these catalysts in a hydrocarbon reforming reaction at improved levels of activity and selectivity.

The use of certain elements of group eight of the periodic table of elements in conjunction with an alumina base as an active reforming catalyst is well-known. To date, four of these elements have been used with varying degrees of success; they are platinum, iridium, rhodium and nickel. Platinum appears to be the most desirable for several reasons; for example, it is much more stable and active than nickel, it is less expensive and more plentiful than rhodium or iridium, and platinum-containing catalysts appear to age better than catalysts containing the other active components.

Certain prior art suggests the substitution of palladium for platinum as the active component in the reforming catalyst (refer to U.S. Patent No. 2,478,916 to Haensel). It is noteworthy, however, that patents rarely, if ever, demonstrate the effectiveness of a palladium-containing reforming catalyst. Such fact is especially surprising in view of the obvious advantage of employing palladium rather than platinum. On an economic basis the use of palladium rather than platinum is about four times more desirable when weights are considered, and almost eight times as desirable in terms of moles. The limited use of platinum-containing catalysts is due to economic consideration (see Haensel's U.S. Patent No. 2,479,110 at column 3); hence, the only reasonable conclusion which may be drawn from the dearth of use or examples of catalysts containing palladium in the reforming field is that no method has been devised which produces a satisfactory catalyst.

In the course of investigations of reforming catalysts, various catalysts containing palladium were prepared by following the procedures generally employed to prepare platinum catalysts and by other and newly devised procedures. These catalysts were tested for their activity by passing n-heptane over them under normal reforming conditions in the presence of hydrogen with highly discouraging results. Data obtained in such tests show the palladium-containing catalysts to have substantial cracking ability without any material reforming characteristics. It was concluded, therefore, that while platinum and palladium may be similar in many respects, they are not equivalents insofar as their catalytic properties in the reforming processes are concerned.

It has now been discovered that palladium-containing catalysts demonstrating exceptional reforming activity can be produced. I have discovered that reforming properties can be imparted to catalysts containing palladium by a novel activation procedure. These and other advantages are obtained by subjecting the palladium-containing catalyst to a treatment with an oxygen-containing gas at elevated temperatures.

To practice my invention, a palladium-containing catalyst having an alumina base is prepared according to any known procedure; the palladium content is generally about 0.01 to 5 weight percent of total catalyst. The catalyst is then subjected to a free oxygen-containing gas for an extended period of time of at least about 15 hours at elevated temperatures. Temperatures of at least about 1200° F. can be used with about 1200 to 1500° F. being representative. Preferred temperatures range from about 1250 to 1400° F. The treatment pressure can be widely varied and can conveniently range from atmospheric to about 500 p.s.i.g. Generally, the higher pressures are employed with the higher temperatures. The length of time for the activation procedure should be compatible with the temperature; e.g. treatment at 1200° F. should be longer than that at 1300° F. In general, highly satisfactory results have been obtained at a temperature of 1300° F. when the treatment extended for at least 18 hours. Generally, the time can be from about 15 to several hundred hours, and about 18 to 80 hours is satisfactory in most instances. Where the oxygen content of the treating gas is low, the longer periods of contact generally are required to obtain maximum activity.

My activation procedure generally improves both the activity and the selectivity of the catalysts treated. In addition to activating the palladium metal, my oxygen treatment apparently tends to increase the isomerization and decrease the cracking and coking effects of the usual palladium catalysts. Also, while my novel activation process is an entity in that no further treatment of the catalyst is necessary, a subsequent standard hydrogen reduction can be employed as an aid in rendering the catalyst more stable.

The following examples are introduced for the purpose of illustrating the novelty and utility of the present invention; it should be understood that the invention is not to be limited by the details of the examples.

EXAMPLE I

An alumina hydrate was precipitated by adding an aqueous solution containing 1 part of ammonium hydroxide to 1 part of water by volume to a solution of analytical reagent grade $AlCl_3.6H_2O$ (solution 1 pound $AlCl_3.6H_2O$ per 2 liters of deionized water) until the pH equalled 8.0. This hydrate was filtered from the mother liquor and washed in a filter press. The cake was then washed by a slurry filter procedure with 2 reslurries and the pH was adjusted to 9.0. After each filtration the cake was washed in the press. This reduced the chloride concentration to less than 0.1% by weight on a dry basis.

The washed cake was then allowed to convert to about 91% trihydrate by aging at room temperature. The aged trihydrate was dispersed in deionized water to give a slurry equivalent to 5.75% by weight $Al_2O_3$. While vigorously stirring the slurry 318 ml. of an aqueous solution of palladium chloride equivalent to 1.5 grams of palladium were slowly added. Stirring continued for 10 minutes. While vigorously stirring 320 ml. of deionized water saturated with $H_2S$ at 78° F. were slowly added. Stirring was continued for 30 minutes.

The resulting slurry was dried at 120° C. in a forced air oven. The dry composition was ground to pass 20-mesh, mixed with 2% Sterotex (organic die lubricant) and formed as 5/32 inch tablets. The die lubricant was burned out using a flowing atmosphere containing 1 part of air to each 60 parts of nitrogen while the temperature was raised to 900° F. and held to provide a total heating time of 9 hours. Calcination was completed at 900° F. in straight air for 3 hours. This catalyst was assigned No. 400–F9639 and analyzed 0.95% palladium.

Catalyst prepared as above was heated at 1300° F. for 66 hours in a slowly flowing atmosphere of oxygen at atmospheric pressure. The catalyst was then tested for activity with respect to reforming n-heptane in the presence of hydrogen. To demonstrate the effect of my activation process, a sample of the same catalyst was given the usual hydrogen reduction treatment but was not treated in accordance with my activation procedure. This catalyst was then tested for activity with respect to reforming n-heptane in the presence of hydrogen. The n-heptane had a Research Octane Number of 0. The results appear in the following table.

Table I

| Catalyst | 400–F9639 (0.95% Palladium) | | | |
|---|---|---|---|---|
| Pretreatment | $H_2$ at 1,200° F., 500 p.s.i.g. for 66 hours | | $O_2$ at 1,300° F., Atm. pressure for 66 hours | |
| Reforming conditions: | | | | |
| Temperature, °F | 925 | 925 | 925 | 925 |
| Pressure, p.s.i.g | 200 | 200 | 200 | 200 |
| WHSV, weight hourly space velocity | 5 | 2 | 5 | 2 |
| Moles $H_2$ per mole n-heptane | 5 | 5 | 5 | 5 |
| Product analysis: | | | | |
| Liq. Prod. Recovered ($C_5$+vol. Percent of feed) | 76.5 | 71.1 | 67.4 | 57.6 |
| Research Octane No. (neat) | 6.0 | 5.7 | 51.9 | 67.4 |

It is immediately apparent, from the above data, that a significant change in catalytic activity occurred as a result of my activation procedure. Two runs were made on each of the above portions of catalyst 400–F9639 without additional treatment of the catalysts between runs. A yield-octane plot of the data obtained results in a straight line showing the catalyst apparently did not deactivate during the two runs.

EXAMPLE II

Another portion of catalyst 400–F9639 was divided into two parts; one part was treated with oxygen at 1300° F. and atmospheric pressure for 48 hours while the other part was untreated. Each sample was tested for activity with respect to reforming in the presence of hydrogen and with a virgin naphtha having a Research Octane Number of 39; two runs were made with each catalyst. The results appear in the following table.

Table II

| Catalyst | 400–F9639 (0.95% Palladium) | | | |
|---|---|---|---|---|
| Pretreatment | None | | $O_2$ at 1,300° F. and Atm. pressure for 48 hours | |
| Reforming conditions: | | | | |
| Temperature, °F | 890 | 925 | 890 | 925 |
| Pressure, p.s.i.g | 500 | 500 | 500 | 500 |
| WHSV, weight hourly space velocity | 4.4 | 4.4 | 4.4 | 4.4 |
| Moles $H_2$ per mole n-heptane | 5 | 5 | 5 | 5 |
| Product analysis: | | | | |
| Liq. Prod. recovered ($C_5$+ vol. percent of feed) | 88.6 | 82.6 | 89.7 | 82.8 |
| Research Octane No. (neat) | 51.0 | 48.0 | 75.6 | 80.0 |

The marked improvement in activity and the apparent retention of activity through several runs of catalysts activated in accordance with my invention are apparent in the above data. A study of data in Tables I and II shows the activation procedure is highly beneficial when compared with untreated catalysts as well as with catalysts subjected to a standard reduction treatment.

As noted my new catalyst exhibits improved activity and selectivity in the reforming of hydrocarbons, particularly petroleum hydrocarbons such as straight run naphthas. The catalyst is contacted with the naphtha stock to be reformed at elevated temperature and under elevated pressure. The temperature ordinarily is in the range of about 875 to 1000° F. and the pressure is in the range of about 150 to 750 p.s.i.g. The catalyst ordinarily is employed in the form of pellets disposed in a fixed bed in a train of reactors, e.g. 2 or 3 in series, equipped with intermediate heating facilities for reheating the reactor effluents of all but the last reactor in order to compensate for endothermic temperature losses. The space velocity through the reactor system is controlled in the range of about 1 to 8 weight hourly space velocity in order to regulate severity. The reaction product is flashed to recover hydrogen gas for recycle and the liquid condensate is stabilized and further fractionated as desired. Hydrogen gas recycle is provided in the range of about 2/1 to 12/1 hydrogen to hydrocarbon ratio. The catalyst however may be in the form of small particles in the range of 100 to 400 mesh produced for example by spray drying. The catalyst then can be handled in the form of a fluidized bed in a main reactor from which a stream of catalyst can be continuously withdrawn for reactivation at a rate sufficient to maintain the activity level at the desired point.

The base of my catalysts can be any of the various forms of alumina which can contain other ingredients such as silica, and the catalysts can contain acidic activating components such as halogens. A particularly useful alumina base is that described in application Serial No. 288,058, filed May 15, 1952, now abandoned, by John W. Teter, John L. Gring and Carl D. Keith. This application discloses a catalyst having a calcined alumina base produced from a mixture of precursor hydrous alumina phases containing from about 65 to 95% alumina trihydrates, the catalyst possessing a number of significant advantages in use as a reforming catalyst or a catalyst for production of aromatics. The finished catalyst has a base structure characterized by large pore volume, e.g. preferably greater than about 0.2 cc. per gram of its pore volume in pores of more than 100 Angstrom units in size, high surface area, e.g. about 350 to about 550 square meters per gram, when the precursor alumina hydrate composition is dried and calcined. My catalysts can contain this base and preferably about 0.1 to about 1.0% by weight of palladium metal.

I claim:

1. A process for activating a palladium-alumina reforming catalyst which comprises heating the catalyst at a temperature of at least about 1200° F. in an atmosphere of a free oxygen-containing gas for at least about 15 hours to improve the reforming properties of the catalyst.

2. The process of claim 1 in which the temperature is about 1200 to 1500° F.

3. A catalyst of improved reforming characteristics consisting essentially of palladium on an alumina base, said catalyst being heated to a temperature of at least about 1200° F. in an atmosphere of a free oxygen-containing gas for about 15 hours.

4. The catalyst of claim 3 in which the temperature is about 1200 to 1500° F.

5. A process for reforming a petroleum hydrocarbon material which comprises contacting said hydrocarbon under reforming conditions of elevated temperature and pressure in the presence of hydrogen and a palladium-alumina reforming catalyst, said catalyst being previously heated to a temperature of at least about 1200° F. in an atmosphere of a free oxygen-containing gas for about 15 hours.

6. The process of claim 5 in which the oxygen treatment of the catalyst is conducted at a temperature of about 1200 to 1500° F.

7. The process of claim 1 in which the free oxygen-containing gas consists essentially of oxygen.

8. The catalyst of claim 3 in which the free oxygen-containing gas consists essentially of oxygen.

9. The process of claim 5 in which the free oxygen-containing gas consists essentially of oxygen.

References Cited in the file of this patent

UNITED STATES PATENTS

| | | |
|---|---|---|
| 2,662,861 | Riblett et al. | Dec. 15, 1953 |
| 2,739,945 | Thorn et al. | Mar. 27, 1956 |
| 2,739,946 | Guyer et al. | Mar. 27, 1956 |
| 2,760,912 | Schwarzenbek | Aug. 28, 1956 |
| 2,781,324 | Haensel | Feb. 12, 1957 |